(No Model.)

N. WALL.
TRAP.

No. 417,298. Patented Dec. 17, 1889.

WITNESSES:
Helmuth Holtz
Percy D. Parks

INVENTOR
Nick Wall
BY
W. R. Stringfellow
ATTORNEY.

UNITED STATES PATENT OFFICE.

NICK WALL, OF NEW ORLEANS, LOUISIANA, ASSIGNOR OF ONE-HALF TO WILLIAM GENESTE, OF SAME PLACE.

TRAP.

SPECIFICATION forming part of Letters Patent No. 417,298, dated December 17, 1889.

Application filed July 8, 1889. Serial No. 316,821. (No model.)

*To all whom it may concern:*

Be it known that I, NICK WALL, a citizen of the United States, residing at New Orleans, in the parish of Orleans and State of Louisiana, have invented certain new and useful Improvements in a Combined Roach, Mouse, and Fly Trap; and I do declare the following to be a full, clear, and exact description of the invention, such as will enable others skilled in the art to which it appertains to make and use the same.

My invention relates to improvements in vermin-traps; and it has for its object to provide a cheap, durable, and efficient device for the capture and retention of mice, cockroaches, flies, and other vermin.

The improvements and the efficiency thereof will be fully understood from the following description and claims when taken in connection with the accompanying drawings, in which—

Figure 1:
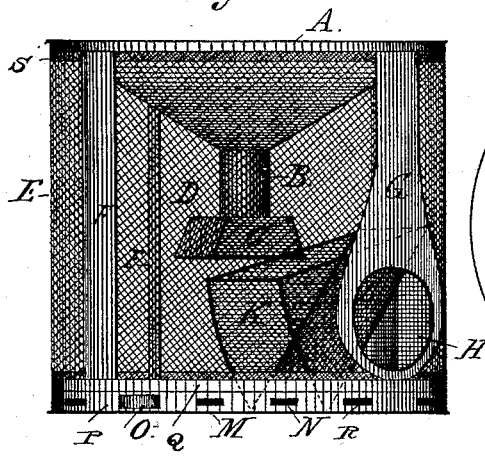
Figure 2:
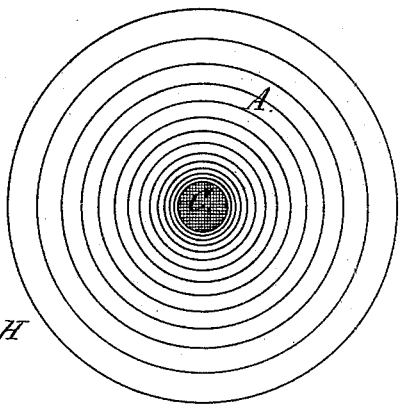
Figure 3:
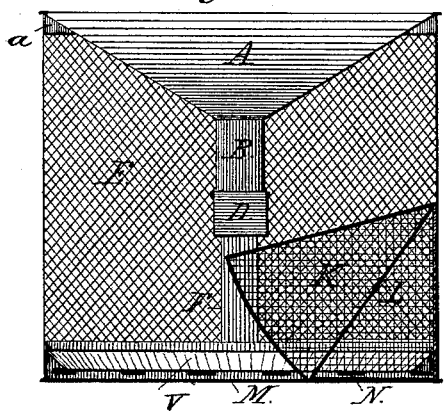
Figure 4:
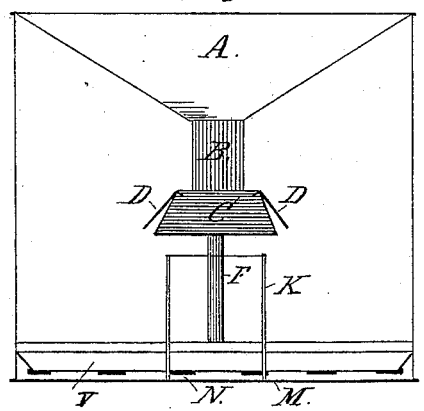
Figure 5:

Figure 1 is a side elevation of my improved trap. Fig. 2 is a plan view thereof. Fig. 3 is a view in elevation taken at right angles to Fig. 1. Fig. 4 is a view of the frame and trapping devices with the wire covering removed, and Fig. 5 is a view of the swinging trap-door of the mouse-entrance.

Referring by letter to said drawings, A indicates the circular concave cover of the trap. This cover is provided upon its periphery with a depending flange *a* to seat the same in the metal rim of the cage, and the concave portion of the top is provided with a surface coating of paper, I having discovered that roaches—for whom this part of the trap is designed—will venture upon a paper surface when they will not go on metal, the paper affording a better foothold. The concave portion of the cover terminates in a central opening of a sufficient size to permit the passage of a roach. Secured to and depending from the circumference of this central opening is a perforated cylinder B. This cylinder B leads to a perforated cage C, which is secured to the base thereof. The cage C is also perforated, and is provided with perforated hinged doors D.

The object in view in perforating the cylinder B, cage C, and doors D is to afford a better foothold for the roach and at the same time attract him by the light admitted through the perforations. When the roach reaches the cage C in his search for food, seeing the same in the main trap or cage, he will pass out through the doors D and fall into the main cage, where his exit will be prevented by the devices hereinafter described.

M indicates the circular base-plate of the main cage. Secured to and rising from this base-plate is a metal band or rim Q. This band Q is provided at equidistant points upon its periphery with elongated openings R, the function of which will be presently described.

S indicates a metal band, which is placed at the top of the main cage, and which acts as a re-enforcement for the edge of the wire cage.

F indicates upright pieces, there being any suitable number employed. These strips or pieces F connect the upper and lower metal rims or bands of the main cage and form a stay-frame for the perforated cage.

G indicates an auxiliary upright connected to the upper and lower metal rims, respectively. This upright G is provided at its lower end with an approximately circular enlargement, in which is cut a circular opening for the entrance of mice or the like, as will be presently described.

E indicates the perforated wall of the trap. This wall extends around the frame and is secured at the top and bottom to the metal bands before described, and the ends thereof are connected to the vertical sides of the auxiliary upright G. It is obvious that by having this wall E perforated it enables the roach to climb up the same, and also allows him to see the bait and other roaches inside of the main cage.

I will now describe the device designed for the capture of flies and the smaller insects. Upon the pheriphery of the metal rim P, I loosely place a band N. The band N is also provided with a button or handle *d* for conveniently moving the same. This band is semi-rotatable, its movements being limited by a lug or stop *b*, attached to the rim and extending through a longitudinal opening O in the rotatable band N. The semi-rotatable band N is provided with elongated openings similar to the openings in the band P, adapted to coincide with and operate in conjunction therewith.

V indicates an inwardly-directed inclined strip which extends around the periphery of the cage, and which allows the entrance of flies and the like, but by its deflection debars the exit of the same.

It is obvious that the elongated openings are left open during the day, and they may be left open or closed during the night, it being preferable to leave them open so as to allow roaches and mice to smell the bait within the cage, there being no danger of the flies escaping.

The parts for the capture of mice and the like consist of two parallel inwardly-extending perforated walls K. These walls are secured at their outer edges to the upright G in any suitable manner, and are connected at their inner upper ends by a horizontal bar, as shown.

L indicates a swinging trap-door. This door, which is perforated to allow the light to pass therethrough, is provided at its top with a hinge-bar, the ends of which are journaled in the upper outer corners of the walls K. This door L is provided along its lower edge with a row of barbs or the like adapted to prevent the egress of the mice. The door L is of a width nearly equal to the distance of the walls from each other, and its length is such that when in place it will extend to the inner lower corners of the wall.

It is obvious that when bait is placed within the main cage it will attract vermin and insects, and the means of ingress being easy they are enticed to enter and are trapped in the manner described.

I claim—

1. In a combined trap, the combination, with the main cage having the concave cover provided with a central opening, of the depending perforated cylinder leading to the perforated cage and the perforated cage and the perforated hinged doors secured thereto, adapted to operate substantially as specified.

2. In a combined roach, mouse, and fly trap, the combination, with the main cage, of the concave cover having a central opening therein, the vertical perforated cylinder secured thereto and leading to a perforated cage or rest having perforated swinging doors, the baseplate having the band rising therefrom, said band having elongated openings, the inwardly-directed inclined deflector-plate, the semi-rotatable band having openings adapted to coincide and operate in connection with the openings in the fixed band, and the inwardly-directed perforated walls leading from a circular opening in the wall and having the inclined perforated door hinged at their upper outer corners, all adapted to operate in the manner substantially as specified.

In testimony whereof I affix my signature in presence of two witnesses.

NICK ×his mark WALL.

Witnesses:
  PERCY D. PARKS,
  JNO. H. ADAMS.